L. L. CUSTER.
INDICATOR FOR INDICATING THE ASCENDING AND DESCENDING MOVEMENTS OF AERIAL VEHICLES.
APPLICATION FILED DEC. 15, 1909.
1,023,132.
Patented Apr. 16, 1912
2 SHEETS—SHEET 1.
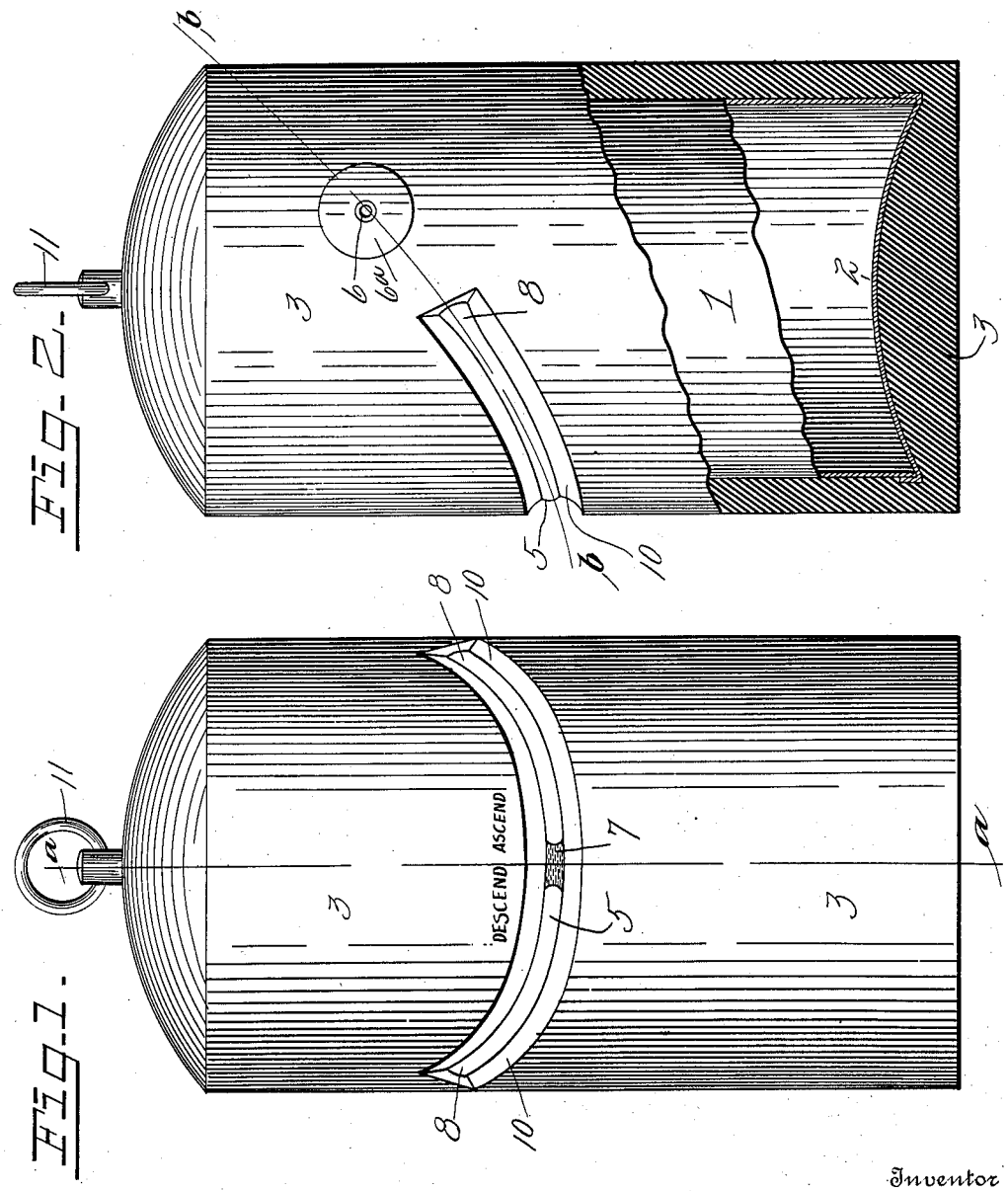
Inventor
L.L. CUSTER.
Witnesses
By
his Attorney

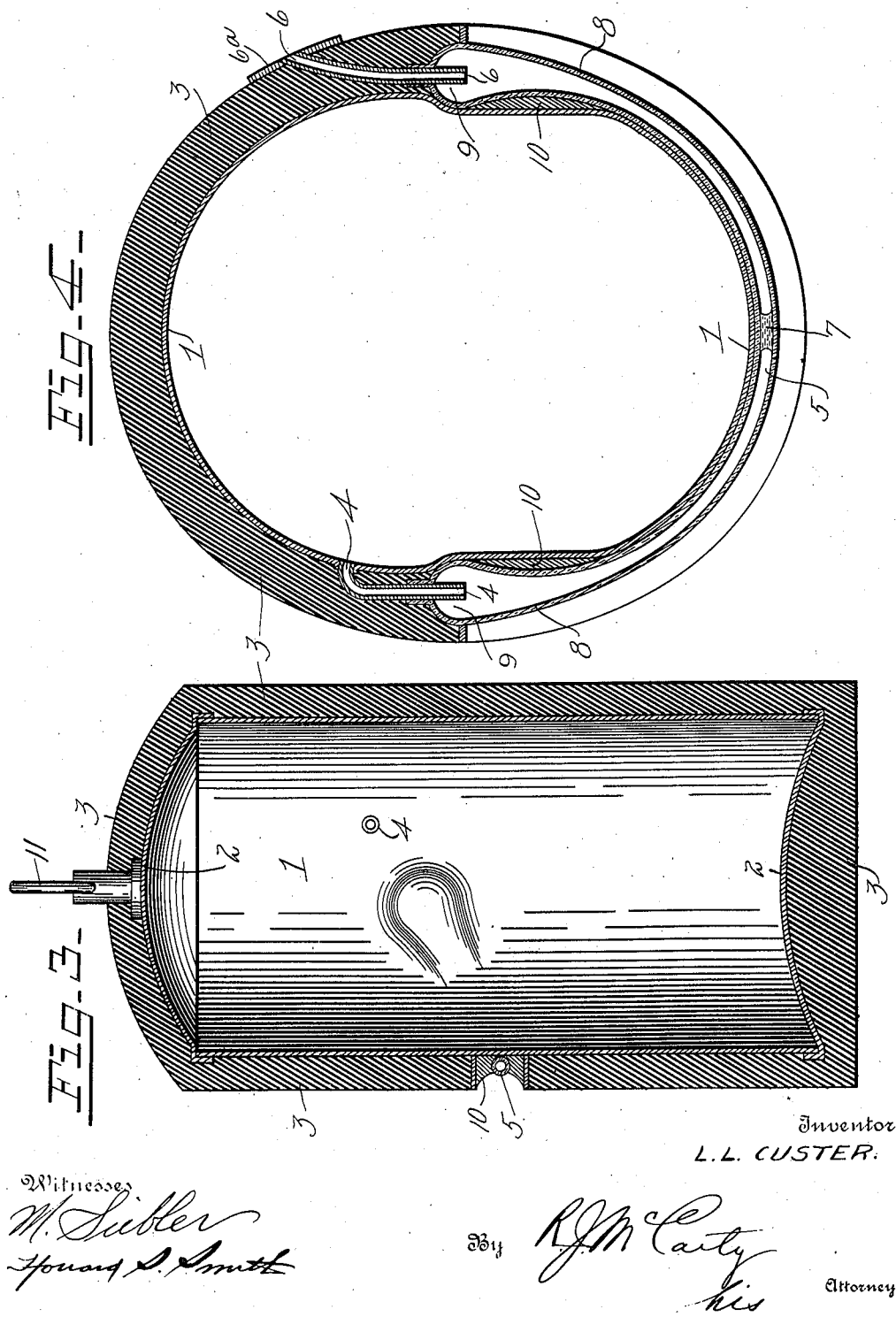

UNITED STATES PATENT OFFICE.

LEVITT LUZERN CUSTER, OF DAYTON, OHIO.

INDICATOR FOR INDICATING THE ASCENDING AND DESCENDING MOVEMENTS OF AERIAL VEHICLES.

1,023,132. Specification of Letters Patent. Patented Apr. 16, 1912.

Application filed December 15, 1909. Serial No. 533,305.

*To all whom it may concern:*

Be it known that I, LEVITT LUZERN CUSTER, a citizen of the United States, residing at Dayton, in the county of Montgomery and State of Ohio, have invented certain new and useful Improvements in Indicators for Indicating the Ascending and Descending Movements of Aerial Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an indicator to be used in aerial navigation to indicate whether the craft on which the device is mounted is ascending or descending.

The operation of the device depends upon atmospheric pressure, which, as is well known, decreases as one ascends. During the subjection of the device to such atmospheric pressure, it indicates the minute changes of the pressure in either direction, thereby showing by the direction of vertical movement whether the air craft is ascending or descending or is substantially stationary in mid-air. The device is also adapted to be used in connection with the weather bureau to indicate minute changes in the temperature of the air and to note atmospheric waves, which information is useful in weather prognostications.

The objects of the invention are to provide a device of this character which is simple in operation, sensitive to the atmospheric pressure, devoid of moving parts or frail mechanism and entirely automatic in its action.

In the accompanying drawings Figure 1 is a front elevation of my improved device. Fig. 2 is a side elevation with the lower portion broken away. Fig. 3 is a sectional view on the line *a—a* of Fig. 1. Fig. 4 is an enlarged cross-sectional view on the line *b—b* of Fig. 2.

Throughout the specification and drawings similar reference characters indicate corresponding parts.

1 designates a cylindrical chamber provided with curved top and bottom surfaces 2. As all sides of the chamber are curved, thereby being rigid, the air within the chamber will be unaffected by the pressure of the outside atmosphere. The chamber 1 is surrounded by suitable insulations 3. The chamber 1 being insulated, the air within the chamber will be unaffected by the temperature of the outside atmosphere. The interior of said chamber communicates with the outside atmosphere through a suitable opening formed by a tube 4, an elongated glass tube 5, and a short tube 6 which communicates directly with the atmosphere through a plate 6ª. The tube 5 is of suitable curvature and is placed on an angle substantially as is shown in Figs. 1 and 2. The said tube may be held in this position by any suitable means such as plaster 10. The top of the device is provided with a ring 11 by means of which it may be properly suspended.

From the above description it will be seen that, if the device is elevated, thereby placing the same in an atmosphere of less pressure, the air within the chamber 1, which is of the pressure of the air of the previously occupied space, will pass through the glass tube 5 to the right and to the atmosphere, and if the device is lowered, thereby placing the same in an atmosphere of greater pressure, the outside air will pass to the left and to the interior of the chamber 1, as the air within said chamber is of less pressure than that of the outside air, or that of the atmosphere of the previously occupied space. Therefore the direction of the passage of the air through the tube 5, indicates the direction of the vertical movement of the device. If, viewing Figs. 1 and 4, the air passes through the tube 5 to the right and to the outside atmosphere, the device is ascending, and on the contrary, the air passes through said tube to the left and to the interior of the chamber, the device is descending. Owing to the fact that air is invisible, the direction of the passage thereof through the tube is ascertained by means of a globule of liquid 7 of contrasting color, placed within the tube 5. This liquid globule is preferably a light non-volatile oil such as kerosene. It being undesirable or impractical to provide the tube 5 of a length corresponding to the possible variations in atmospheric pressure, means are provided which breaks the globule 7 at each end of the tube and returns it to the central portion of the tube where it is re-formed and again comes under the influence of the air in said tube.

It will be seen from the drawings that the central portion of the tube 5 is lower than the ends of said tube, and that the ends of said tube are suitably flared as at 8. The interior bore of said tube is of small diameter and the globule of oil is formed at the central portion of the tube by capillary attraction. When the globule of oil is forced to either end of said tube by the pressure of the air, it expands when passing through the flared ends 8, and will break when the capillary attraction of the glass is greater than the tensile strength of the liquid, consequently, owing to the tube 5 being placed at an angle, the liquid will flow back to the central portion of the tube where it collects and forms a new globule and again comes under the influence of the air within the tube. It will be seen that the rate at which the globules form and break determines the speed of the air through the tube 5, and the rate of speed at which the craft, on which the device is mounted, is ascending or descending.

When in operation the device is placed in a vertical position, but in order to prevent the liquid in the tube from running out of said tube when said device is inadvertently placed on its side, there is provided at each end of the tube a trap 9 which is formed by projecting the ends of the short tubes 4 and 6 into the extreme ends of the flared portions 8 as clearly shown in Fig. 4.

The sensitiveness of the device depends upon the ratio between the capacity of the container 1 and the cross-sectional area of the tube 5. The greater the ratio, the more sensitive is the device, as a greater amount of air will pass through the tube for a given time for a given variation in pressure.

Without limiting myself to the precise arrangement shown and described, I claim:

1. In a device of the type specified, a casing having a chamber therein, a tube extending from, and opening into one side of said chamber, and communicating with the atmosphere, said tube containing a globule of matter by means of which the direction of the passage of air through the tube is ascertained.

2. In a device of the type specified, a casing providing an air chamber, a tube extending from an opening in one side of said chamber and communicating with the atmosphere on the other side, said tube being enlarged at its ends, and a globule in said tube the movement of which indicates the flow of air therethrough, said tube being depressed near the middle portion and gradually raised from said middle portion to its ends.

3. In a device of the type specified, a chamber, a tube communicating with said chamber and with the atmosphere, said tube having enlarged ends, and a globule in said tube serving to indicate the direction of the flow of air in said tube.

4. In a device of the type specified, a casing providing an air chamber, a tube having enlarged ends and provided with a passage extending to the chamber and another passage extending to the atmosphere, a globule within said tube adapted to indicate the direction of the flow of air in said tube, said globule being adapted to break by passing into the enlarged ends of said tube and to reform in the central portion thereof, said tube being depressed near the middle point and gradually rising from said middle point to its ends.

5. In a device of the type specified, the combination with a casing providing a chamber therein, of a tube supported on said casing with its ends elevated above the central portion thereof, one of said ends extending from and opening into said chamber and being adapted to receive air from the chamber, and the other of said ends being open and adapted to receive air from the atmosphere, said tube having within it a globule which is adapted to indicate the direction of air passing through the tube.

In testimony whereof I affix my signature, in presence of two witnesses.

LEVITT LUZERN CUSTER.

Witnesses:
MATTHEW SIEBLER,
HOWARD S. SMITH.